Patented Nov. 20, 1934

1,981,337

UNITED STATES PATENT OFFICE 1,981,337

SODIUM DIPHENYL-PARA-SULPHONATE AND METHOD OF MAKING SAME

Wesley C. Stoesser and Robert F. Marschner, Midland, Mich., assignors to The Dow Chemical Company, Midland, Mich., a corporation of Michigan No Drawing. Application July 26, 1930, Serial No. 471,085

3 Claims. (Cl. 260—159)

The present invention concerns a new compound, namely the sodium salt of the mono-sulphonic acid of diphenyl, as well as methods for the preparation of the same.

We have found that diphenyl can be sulphonated to obtain excellent yields of the mono acid, which latter may then be treated with a sodium compound, e. g. sodium hydroxide, carbonate, bicarbonate, phosphate, chloride, bisulphate, or sulphate, to form sodium diphenyl-para-sulphonate which crystallizes from water in a form containing no water of crystallization. Our invention, then, consists of the method, steps and new product hereinafter fully described and particularly pointed out in the claims, the following description setting forth in detail several modes of carrying out our invention, such disclosed modes illustrating, however, but one of the various ways in which the principle of the invention may be used.

In carrying out our invention, diphenyl is reacted with concentrated or fuming sulphuric acid or mixture thereof, at a temperature between approximately 10° and 100° C. (preferably between about 20° and 70° C.), and in the presence of a suitable solvent or diluent, e. g. nitrobenzene, benzene, or carbon tetrachloride, if desired. For instance, when nitrobenzene is employed as diluent, the general procedure is preferably as follows. Diphenyl is heated with nitrobenzene until the former is substantially completely dissolved, the solution then being cooled whereby the diphenyl may partially crystallize from the solution in finely divided form, and the so obtained mixture or suspension is then sulphonated by adding sulphuric acid thereto at a suitable temperature preferably with agitation. The reaction mixture containing the mono and di-sulphonic acids, excess sulphuric acid and unreacted diphenyl, may then be diluted with water, diphenyl separated therefrom, if present, and the sodium salt of the mono-sulphonic acid of diphenyl precipitated from the solution by the addition thereto of at least one of the abovementioned sodium compounds, the disulphonic acid or the sodium salt thereof, remaining in solution. When a sufficient amount of precipitant has been added, the precipitate may be filtered from the residual liquor and recrystallized from water. If desired, the reaction mixture containing the acids may be poured into an aqueous solution of the sodium compound and the precipitated sodium salt separated from the residual liquor and recrystallized.

The following examples illustrate several ways of carrying out our invention:—

Example 1

1 mole of diphenyl was dissolved in 100 grams of benzene, and the so obtained solution then reacted with 1 mole of concentrated sulphuric acid (specific gravity 1.84) at a temperature of 60-75° C. over a period of 17 hours with stirring. The reaction mixture was poured into water, separated from unreacted diphenyl, and sodium carbonate added thereto in amount sufficient to precipitate the sodium salt of the diphenyl-para-mono-sulphonic acid. The latter salt was separated from the liquid and recrystallized from water, being obtained thereby in an 84 per cent yield based on the reacted diphenyl.

Example 2

In similar manner as in Example 1, 1 mole of diphenyl was reacted with 1 mole of concentrated sulphuric acid in the presence of 50 grams of nitrobenzene as a solvent, and at a temperature of 80-95°C. for 15 hours, the sodium sulphonate being precipitated by adding sodium sulphate, being thereby obtained in an 80 per cent yield based on reacted diphenyl.

Example 3

In similar manner as above, 1 mole of diphenyl was reacted for 4 hours at a temperature of 37-42° C., with 1.46 moles of concentrated sulphuric acid (specific gravity 1.84) in the presence of 75 grams of nitrobenzene as diluent, the mono-sulphonic acid being neutralized by sodium hydroxide, and the sodium diphenyl-para-sulphonate being obtained in a 97 per cent yield based on the reacted diphenyl.

Example 4

Analogously to Example 3, 1 mole of diphenyl was reacted for 4 hours at a temperature of 35-42° C. with 1 mole of concentrated sulphuric acid plus 40 grams of 60 per cent oleum in the presence of 75 grams of nitrobenzene as a diluent, the sodium diphenyl-para-sulphonate being obtained in an 85 per cent yield, based on reacted diphenyl.

Sodium diphenyl-para-sulphonate crystallizes from water in large, thin, colorless plates which contain no water of crystallization, do not melt or decompose when heated to 475° C., and are substantially insoluble in the common organic solvents with the exception of phenol and the alkanols higher than methanol in which latter solvents the said compound is slightly soluble.

The hereindescribed method of preparation of sodium diphenyl-para-sulphonate may be utilized as a way of separating the mono-sulphonic acid from the higher sulphonic acids as well as unreacted sulphuric acid, the mono-sulphonic acid and the sodium salt thereof being less soluble in water or dilute sulphuric acid than are the poly-sulphonic acids and sodium salts thereof, respectively. Hence, on addition to the reaction mixture of a sodium compound as above described, the sodium salt of the mono-sulphonic acid preferentially precipitates, the poly-sulphonic acids and/or sodium salts thereof remaining in solution. The precipitate may then be treated in any suitable way to recover the free acid therefrom.

Our invention, accordingly, consists in the new product, crystalline, sodium diphenyl-para-sulphonate, and a method for the preparation of same, such as by mono-sulphonating diphenyl, diluting the reaction mixture and precipitating the desired salt by addition thereto of a suitable sodium compound.

Other modes of applying the principle of our invention may be employed instead of those explained, change being made as regards the steps herein disclosed, provided the details stated by any of the following claims or the equivalent thereof be employed.

We therefore particularly point out and distinctly claim as our invention:—

1. The method of making sodium diphenyl-para-sulphonate which comprises reacting diphenyl with concentrated sulphuric acid containing sulphur trioxide, at a temperature between about 10° and about 100° C., in the presence of an inert solvent, to form diphenyl-para-sulphonic acid, thereafter adding a water-soluble sodium compound in amount sufficient to form and to precipitate sodium diphenyl-para-sulphonate, and separating the latter from the residual liquor.

2. Non-hydrated crystalline sodium diphenyl-para-sulphonate.

3. In a method of making sodium diphenyl-para-sulphonate, the steps which consist in adding a sodium compound from the group consisting of sodium hydroxide, carbonate, bicarbonate, sulphate, bisulphate, phosphate and chloride, to a solution including diphenyl-para-sulphonic acid but no other compound also capable of being precipitated by the added sodium compound, and then separating the precipitated sodium diphenyl-para-sulphonate from the residual liquor.

WESLEY C. STOESSER.
ROBERT F. MARSCHNER.